Figure 3:
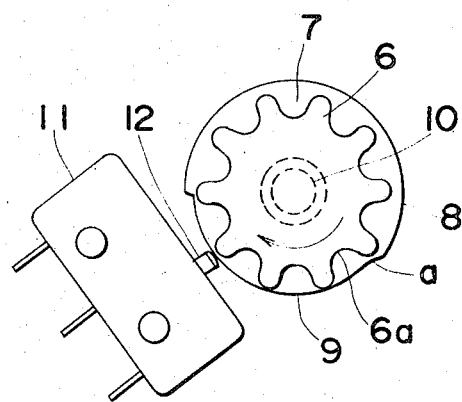

United States Patent [19]

Hasegawa et al.

[11] 3,853,284
[45] Dec. 10, 1974

[54] PASSENGER VEHICLE SAFETY BELT WINDING DEVICE WITH MEANS FOR DETECTING THE PULLED-OUT LENGTH OF A BELT

[75] Inventors: Tsukio Hasegawa; Masahiro Iwatsuki, both of Aichi, Japan

[73] Assignee: Kabushiki Kaisha Tokai Rika Denki Seisakusho, Nishikasugai-gun, Aichi-ken, Japan

[22] Filed: July 14, 1972

[21] Appl. No.: 271,792

[30] Foreign Application Priority Data
July 17, 1971 Japan................................ 46-63015

[52] U.S. Cl. ...... 242/107.4, 200/52 R, 200/61.58 B, 200/153 PA
[51] Int. Cl............................................. B65h 75/38
[58] Field of Search ...... 242/107.4, 107.5 B, 107 R; 280/150 SB; 297/386, 387, 388; 200/153 PA, 52 R, 61.58 B; 74/84, 436

[56] References Cited
UNITED STATES PATENTS
| | | | |
|---|---|---|---|
| 3,504,336 | 3/1970 | Boblitz............................ | 242/107.4 |
| 3,667,698 | 6/1972 | Fisher............................. | 242/107.4 |
| 3,693,147 | 9/1972 | Seo et al. ...................... | 242/107 SB |

*Primary Examiner*—Stanley N. Gilreath
*Attorney, Agent, or Firm*—Craig & Antonelli

[57] ABSTRACT

A passenger vehicle safety belt winding device with means for detecting the pulled-out length of a belt which includes a shaft for winding a belt thereon, intermittent rotating means for counting the rotation number of the shaft and a switch connected with warning means, the switch being operated by the intermittent rotating means, resulting in that the warning means operates upon withdrawal of belt of which length corresponds to the predetermined rotation number of the shaft.

6 Claims, 8 Drawing Figures

FIG. 1
FIG. 2
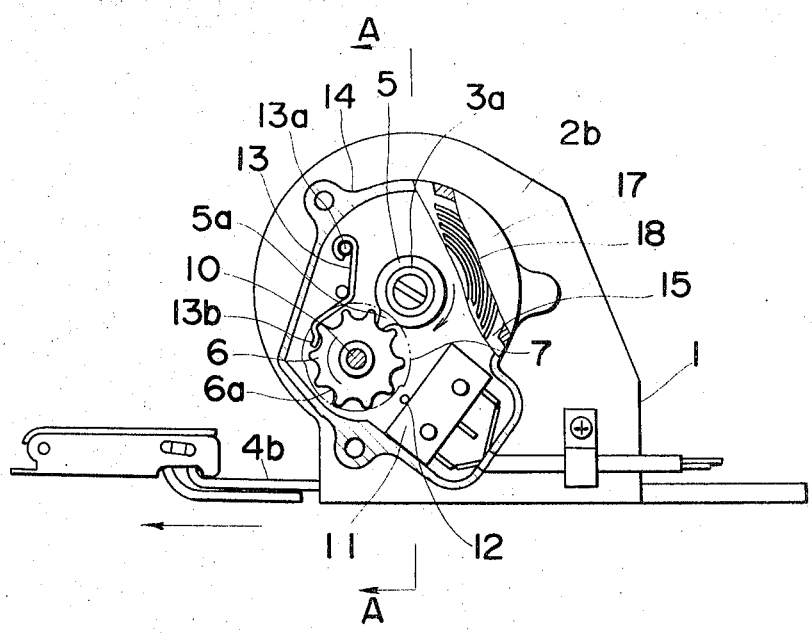
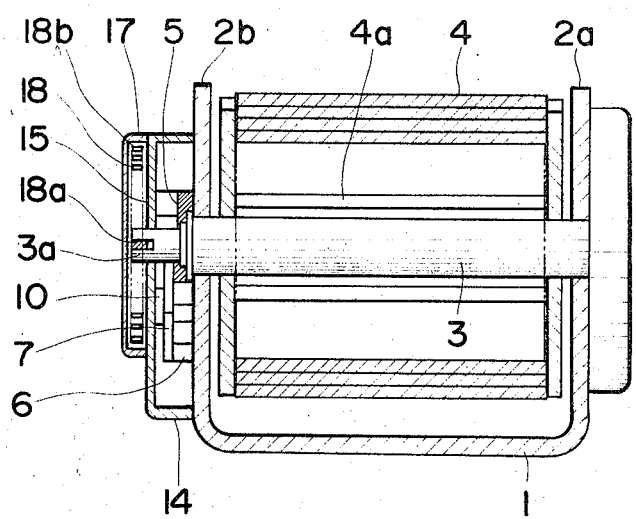

PASSENGER VEHICLE SAFETY BELT WINDING DEVICE WITH MEANS FOR DETECTING THE PULLED-OUT LENGTH OF A BELT

The present invention relates to a belt winding device with means for detecting the amount of unwinding of a wound belt and giving warning by a lamp, buzzer or other means when an insufficient length has been unwound, and has particularly advantageous application to safety belts as used in passenger vehicles or other means of passenger transport.

Usually, the safety belt of the kind above referred to has its internal end secured to a winding shaft, which rotatably journals within the frame fixedly secured inside the roof frame of a vehicle, for automatically winding up the approximate entire length of the belt by means of a coil spring, and has at its external end conventional chucking means such as a clip for detachably securing to the floor frame of the vehicle upon withdrawal of suitable length of the belt from the shaft, whereby the passenger sitting on the seat of the vehicle can put the belt on for fastening himself to prevent his forward movement in the case of a traffic accident.

Also, it is to be noted that the safety belt is normally wound on the shaft at a certain predetermined times corresponding to the pulled-out length of the belt for fastening the passenger, so that it is able to detect the fastening condition of the passenger by the rotating number of the shaft for unwinding the belt. On the other hand, recently, for requiring the passenger to put the belt on, it is preferably desired to provide warning means for giving notice to the passenger when he forgets to use the belt on the seat of the vehicle.

Accordingly, an essential object of the present invention is to provide a passenger vehicle safety belt winding device with means for detecting the pulled-out length of a belt in which a switch for operating warning means is operated by means for counting the number of rotations of a belt winding shaft when the certain predetermined length of the belt is pulled out from the shaft.

Another important object of the present invention is to provide a belt winding device of the kind above referred to wherein the rotation number of the winding shaft is memorized by a gear which operatively cooperates and intermittently rotates every small angle through the rotation engagement of the tooth of the kick gear secured to the winding shaft, the action of the switch being adapted to be controlled by a switch control cam provided in the gear when the winding shaft has reached a given rotation number, thereby to permit accurate detection of the pulled-out length of the belt.

Further object of the present invention is to provide a belt winding device of the kind above referred to which is adapted to be conveniently made in various sizes, which is simple, compact and light-weight in design, which is durable in construction, which is reasonable in manufacturing cost, and which is capable of performing its intended functions in an entirely satisfactory and trouble-free manner.

Figure 4:
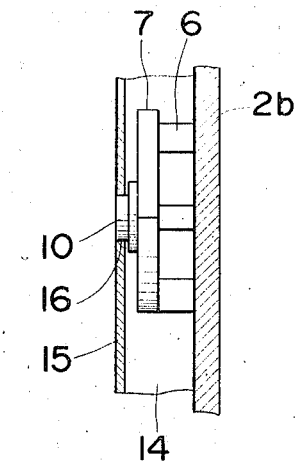
Figure 5:
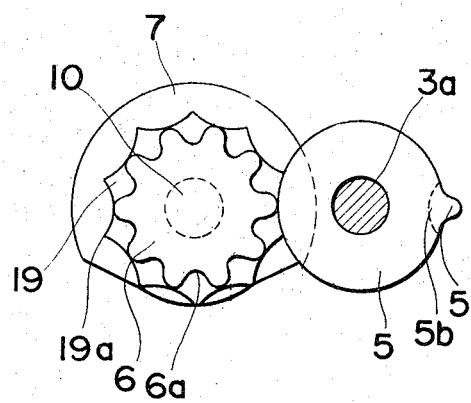
Figure 6:
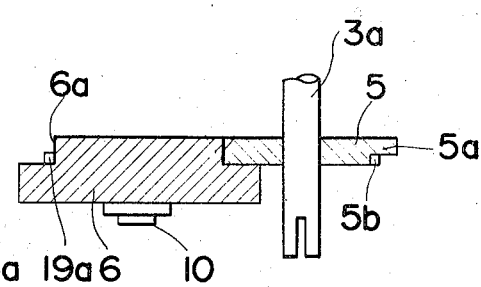
Figure 7:
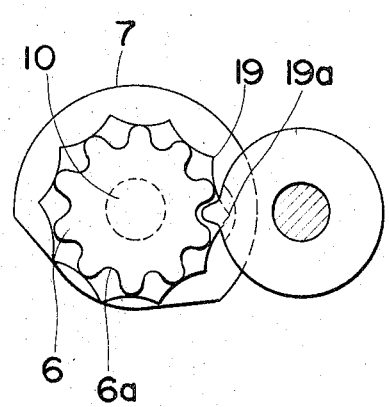
Figure 8:
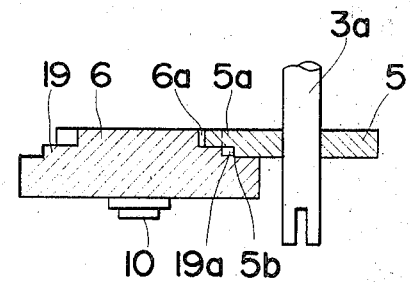

The device of the present invention will become apparent from the following full description of a preferred embodiment taken in conjunction with the attached drawings, in which;

FIG. 1 is a cross-sectional side view of the device according to the preferred embodiment of the present invention, FIG. 2 is an exploded plan view of the device taken along the line A — A in FIG. 1, FIG. 3 is an explanatory enlarged view of a portion of FIG. 1, FIG. 4 is an explanatory enlarged view of a portion of FIG. 2, FIG. 5 is a plan view showing the counting mechanism of another preferred embodiment of the present invention, FIG. 6 is a cross-sectional side view of FIG. 5, FIG. 7 is a plan view showing another condition of FIG. 5, and FIG. 8 is a cross-sectional side view of FIG. 7.

Before the description of the present invention proceeds, it is to be noted that, for the sake of brevity, like parts are designated by like reference numerals throughout the several views of the accompanying drawings. It is also to be noted that the concept of the present invention as well as its detecting device can be applied in any apparatus other than the safety belt of vehicles, for example, in connection with an intermittent rotary motions for counters and meters.

According to a first preferred embodiment of the present invention, as clearly shown in FIGS. 1 through 4, a device has an approximately U-shaped frame 1 which has two side flanges $2a$ and $2b$ at its both sides, and from the bottom portion of which a belt 4 can be withdrawn. A belt winding shaft 3 is rotatably mounted in a hole of the flange $2a$ and through a hole of the flange $2b$, beyond which it projects to form a projecting portion $3a$, and is provided in its central portion between two flanges $2a$ and $2b$ with a clip, or other means, for firmly securing the one end of the belt 4. Near the flange $2b$, on the projecting portion $3a$ of the winding shaft 3 is rigidly mounted a kicker gear 5 with a single transfer tooth $5a$ which can engage with a pinion gear 6 once per one revolution of the winding shaft 3. The pinion gear 6 which has teeth of the same number or more as the winding number of the belt 4 of which the approximate entire length has been wound up around the winding shaft 3 is placed around the kicker gear in the position that the pinion gear 6 can engage with the tooth of the kicker gear. This pinion gear 6 is locked to a cam 7 with a large diameter portion 8 and a small diameter portion 9 at its periphery, each of which length respectively corresponds to a certain number of teeth of the pinion gear, and both the pinion gear and the cam are rigidly mounted on a shaft 10 which may be rotatably mounted either, at one end, in a hole of the flange $2b$ or, at the other end, in a hole of a cover 14 provided over the outside of the flange $2b$. For simplicity of the construction, both the cam 7, the pinion gear 6 and the shaft 10 are made of plastic in one single piece. The cover 14 is fixedly secured to the outside of the flange $2b$ and is provided with another cover 17 at its outside. The winding shaft projection portion $3a$ projects further beyond the wall 15 of the cover 14 into the space formed by another cover 17, where it is fixedly connected to one end of a coil spring 18, the other end of which is also firmly attached to the cover 17. The tensile force of the coil spring 18 acts constantly in the direction for winding-in the belt 4 and is great enough to cause the winding shaft 3 to completely wind-in the belt unless otherwise restrained so that any unwinding of the belt 4 has to be done against the tensile force of the coil spring 18. In the cover 14 a switch 11 with a spring-back push-button 12 is provided to the outside of the flange 2b for actuating or turning on a warning lamp or buzzer which is provided in the vehicle for noticing the passenger to need to fasten the belt. The switch 11 is actuated itself by the push button 12 on its surface, which is depressed when in contact with the large diameter portion 8 of the cam 7 and free to spring back when opposite the small diameter portion 9. This switch 11 is switched off when the push-button is depressed and switched on when the push-button is in the raised position. For preventing the blind rotation of the pinion gear 6 is provided a spring plate 13 which has one end firmly attached to the inside of the cover 14 has part of its length at the other end in forced contact with the tooth of the pinion gear 6 by the resilient force of itself. Thus, the pinion gear 6 is held clamped and unable to rotate by engagement with the spring plate 13 unless to do so by engagement with the transfer tooth 5a while the winding shaft 3 is rotating, so that the pinion gear 6 advances one tooth pitch length at each revolution of the winding shaft 3 by the engagement with the spring plate 13, but is otherwise held stationary by the engagement with the spring plate 13, with the result that there is no slip or miscounting of winding shaft revolutions.

The power supply to the lamp and buzzer is from any conventional source and is turned on or off by the switch 11. The power supply itself can be switched on at source either manually or automatically by any conventional means. When the belt 4 is fully wound in, the spring-back push-button 12 is opposite the small diameter portion 9 of the cam 7, as shown in FIG. 1, in other words the lamp and buzzer are on, and stay on until the push-button 12 is depressed by the large diameter portion 8 of the cam 7.

If now the belt 4 is pulled-out, as it is withdrawn, viewed from the flange 2b side the winding shaft 3 rotates in a clockwise direction, and once each revolution the transfer tooth 5a on the kick gear 5, which is rigidly mounted on the winding shaft 3, engages with the pinion gear 6, driving it one tooth pitch length in an anticlockwise direction. At the start of unwinding, the position of the cam 7 relative to the spring-back push-button 12 is such that the cam 7 must practically turn through the whole of the angular distance corresponding to the small diameter portion 9 of the cam 7 before its large diameter portion 8 comes into contact with the push-button 12. Further, the number and pitch of the pinion gear 16 teeth opposite the small diameter portion 9 are so proportioned that the large diameter portion 8 does not come into contact with the push-button 12 until the winding shaft 3 has made a number of the revolutions corresponding to withdrawal of a predetermined, suitable length of the belt. In other words, the lamp and buzzer are switched on at the start of unwinding and stay switched until a suitable length of belt has been unwound, at which time the spring-back push-button 12 is depressed by the large diameter portion 8 of the cam 7, and the lamp and buzzer are switched off.

When the belt 4 is wound up, the winding shaft 3 is automatically rotated in reverse direction by the action of the coil spring 18. Upon the relative movement of the push button 12 from the shifting the large diameter portion 8 of the cam 7 to the small diameter portion 9, the switch 11 acts in a reverse way to what is described hereinbefore.

Accordingly, the rotation number of the winding shaft 3 produced by pulling out the entire length of the belt 4 can be memorized by intermittently rotating the pinion gear 6 every time the kick gear 5, which is secured to the winding shaft 3, makes one rotation and by rotating the pinion gear 6 less than one rotation. The gear 6 and the cam 7 which operatively cooperate with the kick gear can accurately calculate the rotation number of the winding shaft 3 by setting the control of the switch 11 by the cam 7 to the predetermined rotation number of the winding shaft 3, while they can correctly detect the pulled-out length of the belt 4. Also, the pinion gear 6 can be applied by a small diameter gear and the cam 7 may be manufactured smaller in diameter so as to fit the diameter of the pinion gear 6, whereby the controlling mechanism of the switch 11 can be integrated smaller to advantageously fit the frame 1.

Therefore, the device of the present invention can be advantageously employed in a vehicle for generating electric signals in accordance with withdrawal of a predetermined, suitable length of the belt 4.

FIGS. 5 through 8 illustrate the essential features of another preferred embodiment of the device of the present invention. In this embodiment the means for preventing slip of the pinion gear 6 are provided by a disc 19 fixedly attached to the pinion gear 6, and to correspond to this disc 19 the formation of the kick gear 5 on the winding shaft 3 is different, as is explained below. The disc 19 is fixedly attached to the same shaft as to the pinion gear 6 and the two must turn together. The outer periphery of the disc 19 forms a continuous series of concave arcs whose radius is the same as that of a small arc of the circle formed by the kick gear on the winding shaft 3. The transfer tooth 5a of the kick gear 5 is undercut with a cutout portion 5b which provides clearance for the extremities 19a of the arced portions on the periphery of the disc 19 when the transfer tooth 5a engages the pinion gear 6. When the transfer tooth 5a is not engaging the pinion gear 6 the outer periphey of the kick gear 5 is in sliding contact with one of the arc portions 19b on the periphery of the disc 19. Hence, the kick gear 5 is free to turn but the disc 19 cannot turn until clearance for the extremities 19a is provided by the cutout portion 5b below the transfer tooth 5a. Thus, when the transfer tooth 5a engages the pinion gear 6 the latter is driven and is free to rotate, together with the disc 19, but is otherwise stopped from turning by the engagement between the outer periphery of the kick gear 5 and the arc portion 19a of the disc 19, and a non-slip turns detecting operation is achieved as in the first embodiment, the construction of this embodiment otherwise being the same as that of the first embodiment.

The device of the present invention offers considerable advantages compared with conventional devices. Its construction is simpler and therefore cheaper; slip and miscounting, and the problems this can lead to, are eliminated by temporary clamping of the counting mechanism by a spring or other means; and its construction is much more compact than that of conventional devices, which presents obvious advantages.

Although the present invention has been fully described with reference to the accompanying drawings in connection with the preferred embodiments thereof, various changes and modifications are apparent to those skilled in the art. Therefore, the present invention is not to be limited thereby and such changes and modifications shoul be construed within the scope of the present invention unless otherwise they depart therefrom.

What is claimed is:

1. A passenger vehicle safety belt winding device comprising a frame, a shaft rotatably mounted on the frame and fixedly securing one end of a belt adapted to be wound thereon, a spring constantly urging the shaft in one direction of rotation to wind the belt onto the shaft, and means for detecting the pulled-out length of the belt, the detecting means including a kick gear rigidly mounted on the shaft and having a single transfer tooth at the periphery thereof, a pinion gear rotatably mounted on the frame and having at least the number of teeth corresponding to the number of rotations of the shaft required to pull out the full length of the belt from the shaft, the pinion gear being positioned to engage the transfer tooth of the kick gear once during each revolution of the kick gear for rotation one tooth position by the kick gear such that the rotational position of the pinion gear corresponds to the number of revolutions of the shaft, means for permitting rotation of the pinion gear upon engagement and rotation thereof by the kick gear and for maintaining the pinion gear in a stationary condition when the pinion gear is out of engagement with the kick gear, a cam rigidly mounted on the pinion gear and having large and small diameter portions, the large diameter portion having a circumferential length corresponding to a predetermined number of teeth of the pinion gear, and a switch having a push button positioned for engagement with the large diameter portion of the cam for controlling the operation of a warning means connected with the switch, the large diameter portion of the cam engaging the push button when a predetermined number of revolutions of the shaft corresponding to a predetermined pulled-out length of the belt has been attained.

2. A passenger vehicle safety belt winding device as defined in claim 1, wherein the means for maintaining the pinion gear in a stationary condition comprises a spring plate secured at one end to the frame and constantly urging the other end thereof into contact with the pinion gear.

3. A passenger vehicle safety belt winding device as defined in claim 1, wherein the kick gear has a circular periphery with the transfer tooth extending therebeyond, and the means for maintaining the pinion gear in a stationary condition comprises a disk fixedly attached to the pinion gear and having an outer periphery forming a continuous series of concave arcs for engaging the circular periphery of the kick gear, the kick gear being provided with a cutout portion undercut of the transfer tooth for providing a clearance to the extremity of the arc portions of the disk when the transfer tooth engages the pinion gear.

4. A passenger vehicle safety belt winding device comprising a frame, a shaft rotatably mounted on the frame and securing one end of a belt adapted to be wound thereon, a spring constantly urging the shaft in one direction of rotation to wind the belt onto the shaft, and means for indicating the withdrawal from the shaft of a predetermined length of the belt sufficient to fasten a passenger in a seat of the vehicle, said indicating means including a kick gear rigidly mounted on the shaft and having a single transfer tooth at the periphery thereof, the kick gear rotating one revolution for each revolution of the shaft, a pinion gear rotatably mounted on the frame and having at least the number of teeth corresponding to the number of revolutions of the shaft required to withdraw the full length of the belt from the shaft, the pinion gear being positioned to engage the transfer tooth of the kick gear once during each revolution of the kick gear for rotation one tooth position by the kick gear such that the rotational position of the pinion gear corresponds to the number of revolutions of the shaft, means for permitting rotation of the pinion gear upon engagement and rotation thereof by the kick gear and for maintaining the pinion gear in a stationary condition when the pinion gear is out of engagement with the kick gear, a cam rigidly mounted on the pinion gear and having a large and a small diameter portion, the small diameter portion having a circumferential length corresponding to the number of teeth representing the number of revolutions of the shaft corresponding to the predetermined length of the belt, and switch means positioned approximate to the cam and arranged for engagement by the large diameter portion of the cam upon attainment of the predetermined length of the belt for controlling the operation of a warning means.

5. A passenger safety belt winding device as defined in claim 4, wherein the means for maintaining the pinion gear in a stationary condition comprises a spring plate secured at one end to the frame and constantly urging the other end thereof into contact with the pinion gear.

6. A passenger safety belt winding device as defined in claim 4, wherein the kick gear has a circular periphery with the transfer tooth extending therebeyond, and the means for maintaining the pinion gear in a stationary condition includes a disk fixedly attached to the pinion gear and having an outer periphery forming a continuous series of concave arcs for engaging the circular periphery of the kick gear, the kick gear being provided with a cutout portion in the region of the transfer tooth for providing a clearance to the extremity of the arc portions of the disk when the transfer tooth engages the pinion gear.

* * * * *